(12) United States Patent
McCormick et al.

(10) Patent No.: US 9,407,561 B2
(45) Date of Patent: Aug. 2, 2016

(54) SYSTEMS AND METHODS FOR TRAFFIC ENGINEERING IN SOFTWARE DEFINED NETWORKS

(71) Applicant: Huawei Technologies Co., Ltd., Shenzhen (CN)

(72) Inventors: William C. McCormick, Ottawa (CA); Peter Ashwood-Smith, Gatineau (CA); Francis P. Kelly, Cambridge (GB)

(73) Assignee: Huawei Technologies Co., Ld., Shenzhen (CN)

( * ) Notice: Subject to any disclaimer, the term of this patent is extended or adjusted under 35 U.S.C. 154(b) by 109 days.

(21) Appl. No.: 14/307,225

(22) Filed: Jun. 17, 2014

(65) Prior Publication Data
US 2014/0376383 A1    Dec. 25, 2014

Related U.S. Application Data

(60) Provisional application No. 61/949,840, filed on Mar. 7, 2014, provisional application No. 61/836,992, filed on Jun. 19, 2013.

(51) Int. Cl.
*H04L 12/841* (2013.01)
*H04L 12/851* (2013.01)

(52) U.S. Cl.
CPC .................. *H04L 47/2441* (2013.01)

(58) Field of Classification Search
None
See application file for complete search history.

(56) References Cited

U.S. PATENT DOCUMENTS

| | | | | |
|---|---|---|---|---|
| 6,904,017 | B1 * | 6/2005 | Meempat et al. | 370/238 |
| 6,950,407 | B1 * | 9/2005 | Huddle | 370/254 |
| 8,547,851 | B1 * | 10/2013 | Jacobson et al. | 370/238 |
| 2002/0141345 | A1 | 10/2002 | Szviatovszki et al. | |
| 2002/0186658 | A1 | 12/2002 | Chiu et al. | |
| 2004/0246905 | A1 | 12/2004 | Dunagan et al. | |
| 2008/0049621 | A1 | 2/2008 | McGuire et al. | |
| 2008/0285458 | A1 * | 11/2008 | Lysne | 370/238 |
| 2009/0257380 | A1 * | 10/2009 | Meier | 370/329 |
| 2014/0049999 | A1 | 12/2011 | Azodolmolky | |
| 2012/0314575 | A1 | 12/2012 | Frank et al. | |
| 2013/0039187 | A1 | 2/2013 | Strulo et al. | |
| 2013/0121146 | A1 | 5/2013 | Hassidim et al. | |

OTHER PUBLICATIONS

Kelly, F., et al., "Global Optimization of Network Flows," Technical Note, 16 pages.

Hong, C., et al., "Achieving High Utilization with Software—Driven WAN," Proceedings of the ACM SIGCOMM 2013 conference on SIGCOMM, Aug. 12-16, 2013, Hong Kong, China.

(Continued)

*Primary Examiner* — Chi H Pham
*Assistant Examiner* — Shick Hom
(74) *Attorney, Agent, or Firm* — Slater Matsil, LLP

(57) ABSTRACT

Traffic engineering vector operations that are capable of being independently solved can provide near-linear scalability through the exploitation of massively parallel processing. Optimization can be performed simultaneously on different paths in a data plane, as well as on different links within the same path (or within the same set of paths). In some embodiments, the traffic engineering vector operations include an adjustable alpha-fairness variable that allows managers to achieve different levels of fairness/throughput. Hence, embodiment alpha fairness techniques provide flexible policy execution, while maintaining excellent scalability for large network implementations.

25 Claims, 12 Drawing Sheets

(56) References Cited

OTHER PUBLICATIONS

Jain, S., et al., "B4: Experience with a Globally-Deployed Software Defined WAN," Conference: Proceedings of the ACM SIGCOMM 2013 conference on SIGCOMM, vol. 43, pp. 1-12, Aug. 2013.

Nash, J., et al., "The Bargaining Problem," Econometrica, Apr. 1950, vol. 18, Issue 2, pp. 155-162.

Boyd, S., et al., "Convex Optimization," 2004, pp. 1-730, United States of America of Cambridge University Press, New York.

Kelly, F., et al., "Fairness and Stability of End-to-End Congestion Control," European Journal of Control, vol. 9, Issues 2-3, Sep. 2003, pp. 159-176, Elsevier Ltd.

Uchida, M., et al., "An Information-Theoretic Characterization of Weighted alpha-Proportional Fairness," 2009 Proceedings IEEE on INFOCOM, Apr. 19-25, 2009, pp. 1053-1061.

Azodolmolky, S., et al., "Integrated OpenFlow—GMPLS Control Plane: An Overlay Model for Software Defined Packet Over Optical Networks," 2011 37th European Conference and Exhibition on Optical Communication, Sep. 18-22, 2011, pp. 1-3.

Voice, T., et al., "Stability of Congestion Control Algorithms with Multi-Path Routing and Linear Stochastic Modelling of Congestion Control," Proceedings of the 1st international conference on Performance evaluation methodologiesand tools, May, 2006, pp. 1-211.

Voice, T., et al., "Stability of Multi-Path Dual Congestion Control Algorithms," IEEE/ACM Transactions on Networking, Dec. 2007, vol. 15, No. 6., pp. 1231-1239.

International Search Report and Written Opinion received in International Application No. PCT/US2014/04999, mailed Dec. 31, 2014, 9 pages.

Danna, E., et al., "A Practical Algorithm for Balancing the Max-min Fairness and Throughput Objectives in Traffic Engineering," 2012 Proceedings IEEE on INFOCOM, Mar. 25-30, 2012, pp. 846-854.

McCormick, B., et al. "Real time alpha-fairness based traffic engineering." retrieved Jun. 17, 2014 from statslab.cam.ac.uk/~frank/PAPERS/hotsdn2014.pdf.

* cited by examiner

SYSTEMS AND METHODS FOR TRAFFIC ENGINEERING IN SOFTWARE DEFINED NETWORKS

This patent application claims priority to U.S. Provisional Application No. 61/836,992 filed on Jun. 19, 2013 and entitled "Convex Optimization for Traffic Engineering in Software Defined Networks," and U.S. Provisional Application No. 61/949,840, filed on Mar. 7, 2014 and entitled "Systems and Methods for Traffic Engineering in Software Defined Networks," both of which are hereby incorporated by reference herein as if reproduced in their entireties.

TECHNICAL FIELD

The present invention relates to software defined networking, and, in particular embodiments, to systems and methods for traffic engineering in software defined networks.

BACKGROUND

Software-defined networking (SDN) allows network administrators to manage network services through abstraction of lower level functionality. One SDN strategy is to reduce network complexity by decoupling the control plane from the data plane. This can be achieved using an SDN controller to manage resource provisioning in a network, thereby alleviating processing load from the switching components. Notably, traffic engineering can be processing intensive for SDN controllers servicing large networks, as the computational complexity of optimization algorithms increase significantly as additional links are added to the network. Moreover, current optimization algorithms are typically purpose built to achieve a specific objective, e.g., max-min fairness, maximum throughput, etc., and are incapable of being dynamically adjusted to provide different performance characteristics, e.g., higher throughput versus higher quality of service (QoS). Accordingly, efficient SDN optimization algorithms that are capable of being dynamically adjusted to provide different performance characteristics are desired to obtain scalable SDN techniques for implementation in large/diverse networks.

SUMMARY OF THE INVENTION

Technical advantages are generally achieved, by embodiments of this disclosure which describe systems and methods for traffic engineering in software defined networks.

In accordance with an embodiment, a method for traffic engineering is provided. In this example, the method includes identifying a plurality of paths for communicating connection-oriented traffic flows over a data plane. The data plane includes a plurality of links, and each path includes one or more of the links and extends between one of a plurality of source-destination pairs. The method further comprises iteratively computing a set of vector operations to obtain a first set of flow assignments. Iteratively computing the set of vector operations includes computing, for each iteration, flow rates for the plurality of paths, shadow prices for the plurality of links, and aggregate flow rates for the plurality of source-destination pairs. The method further includes communicating the first set of flow assignments to network nodes on the data plane. The first set of flow assignments are configured to control communication of the connection-oriented traffic flows over the plurality of paths during a first period. A controller apparatus for performing this method is also provided.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Conventional SDN traffic engineering techniques typically involve linear programming of paths associated with a source destination pair, such that optimization for one path relies on the optimization results of another path. Likewise, conventional SDN traffic engineering techniques also involve linear programming of links associated with a single path, such that optimization for one link relies on the optimization results of another link. As a result, conventional SDN traffic engineering techniques generally exhibit polynomial computation scalability, making them ill-suited for large networks in which many paths need to be considered for the same traffic flow. One technique for improving the scalability of traditional SDN traffic engineering techniques is to relax the fairness constraints. While this technique reduces the computation complexity of the path optimization, it also mitigates much of the resource allocation efficiency benefits provided by SDN traffic engineering. As such, scalable SDN traffic engineering techniques capable of providing flexible, yet efficient, performance are desired.

Aspects of this disclosure provide techniques for applying alpha-fairness resource allocation schemes to SDN traffic engineering optimization in a manner that provides both near-linear scalability and the exploitation of massively parallel processing. More specifically, embodiment techniques allow optimization to be performed on different paths simultaneously, as well as for optimization to be performed on different links with the same path (or within the same set of paths) simultaneously. Indeed, preliminary simulation results suggest that the embodiment alpha-fairness techniques provided by this disclosure provide significantly faster execution times than conventional linear programming schemes. Moreover, the embodiment alpha-fairness resource allocation techniques provided herein allow managers to adjust an alpha-fairness parameter to achieve different levels of fairness/throughput. Hence, embodiment alpha fairness techniques provide flexible policy execution, while maintaining excellent scalability for large network implementations. These and other details are described in greater detail below.

Figure 1:
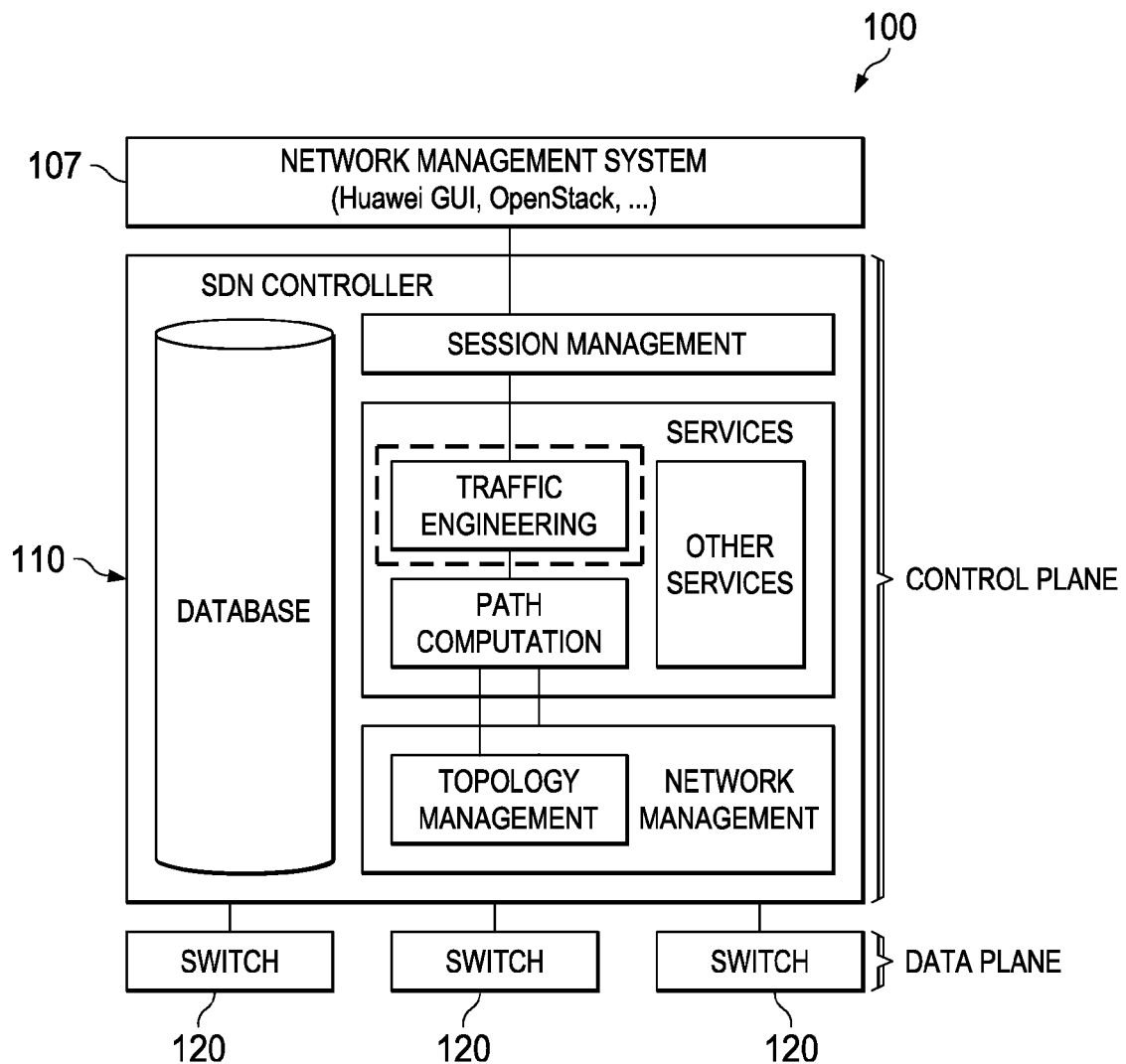
FIG. 1 illustrates a diagram of an embodiment SDN architecture.

FIG. 1 illustrates an embodiment SDN architecture 100 comprising a management system 105, an SDN controller 110, and a network of interconnected switches 120. The SDN controller 110 provides SDN control plane services to a data plane interconnecting the switches 120. The management system 105 is configured to allow a network operator to manage operation of the SDN controller 110, thereby affecting the nature and manner in which control plane services are provided. As shown, the SDN controller 110 provides a variety of SDN control services to the data plane of the SDN architecture via network management functions. More specifically, network management functions may include a topology management feature that learns the network topology. The network topology may be provided to a path computation engine that computes diverse paths between ingress and egress points. Thereafter, a traffic engineering function compute flow assignments for these paths. In an embodiment, the path computation engine is configured to utilize an alpha-fairness resource allocation scheme to compute the flow assignments.

Figure 2A:
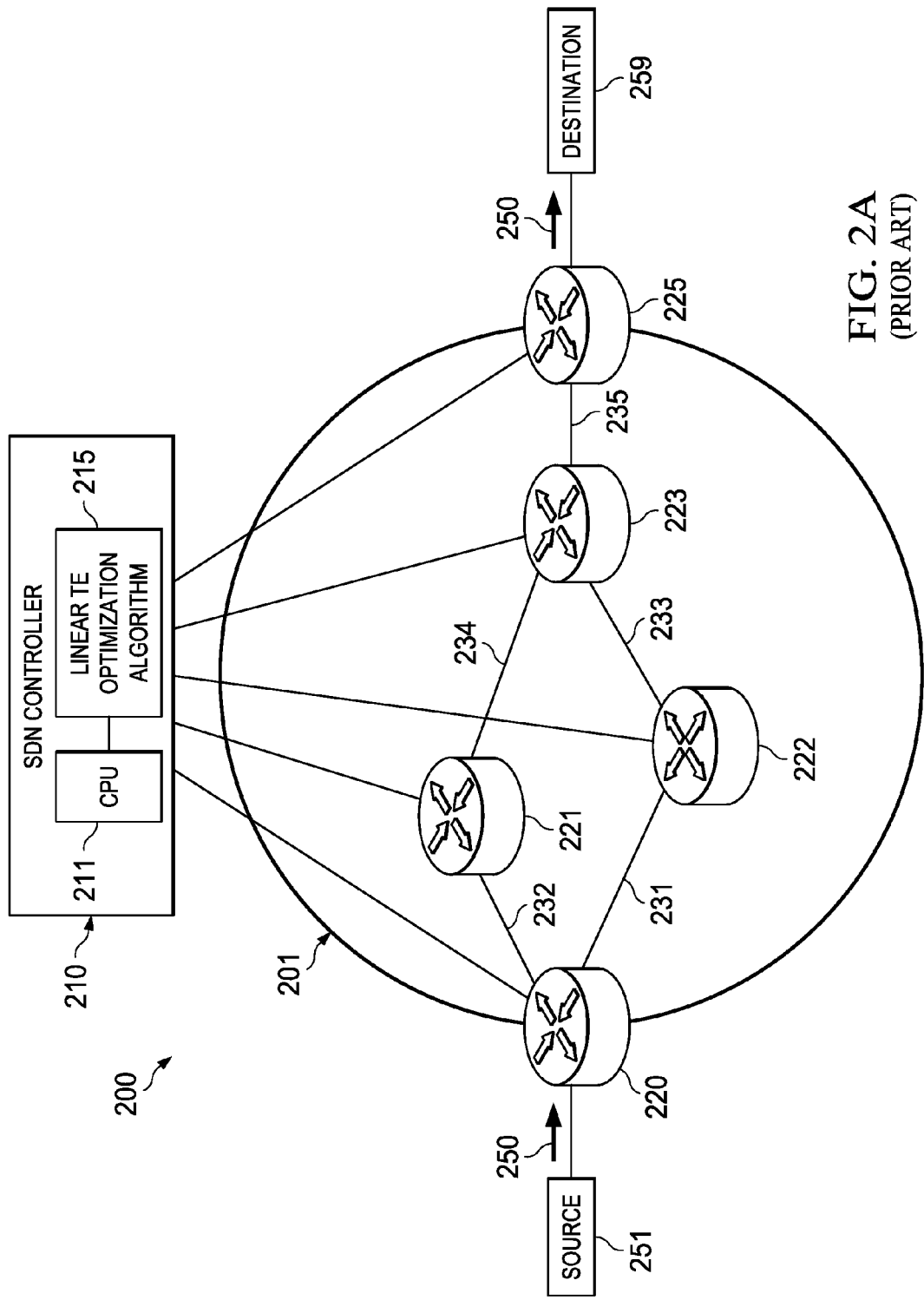
FIGS. 2A-2C illustrate diagrams of a traditional SDN architecture adapted to compute flow assignments in accordance with a linear TE optimization scheme.
Figure 2B:
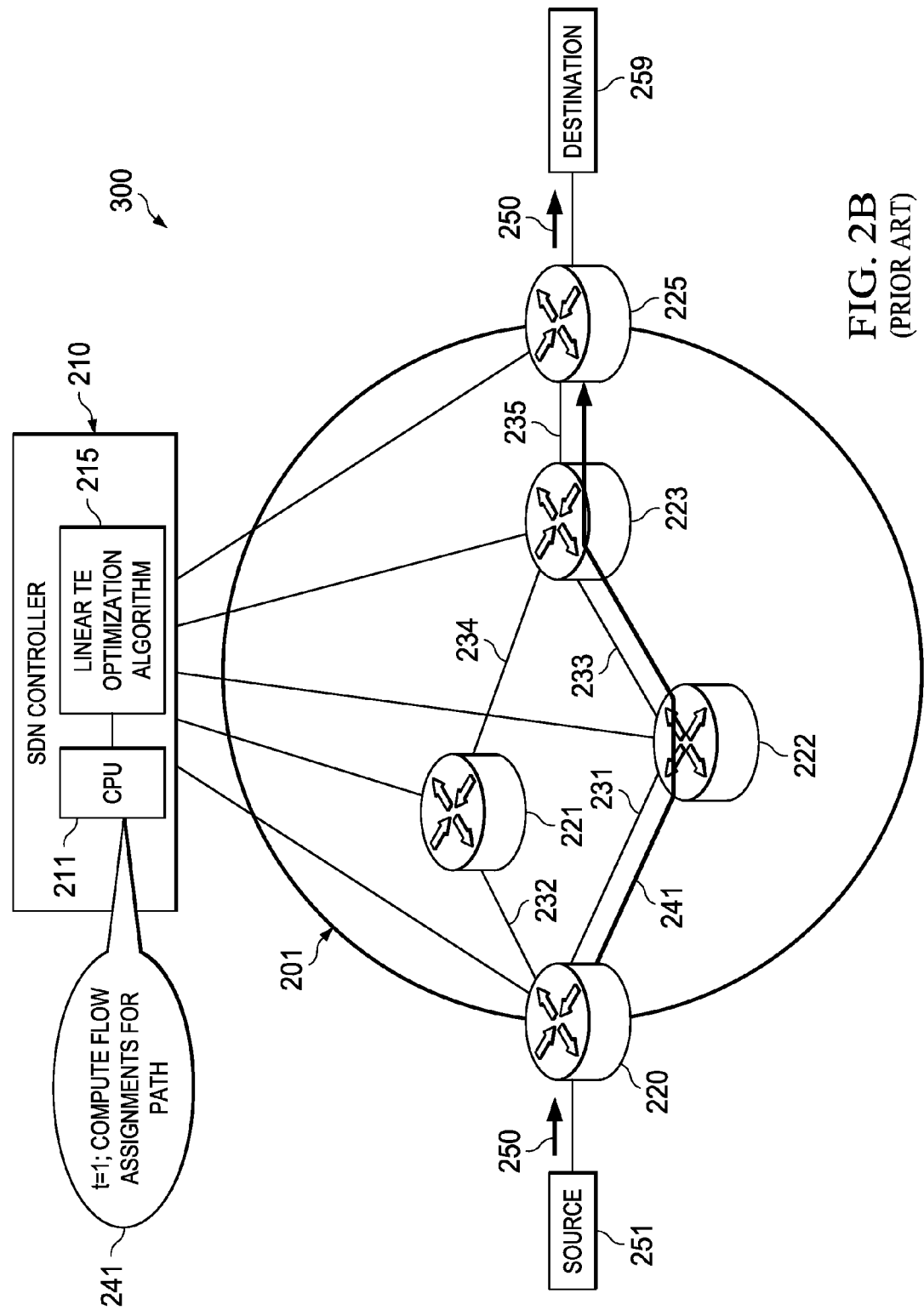
Figure 2C:
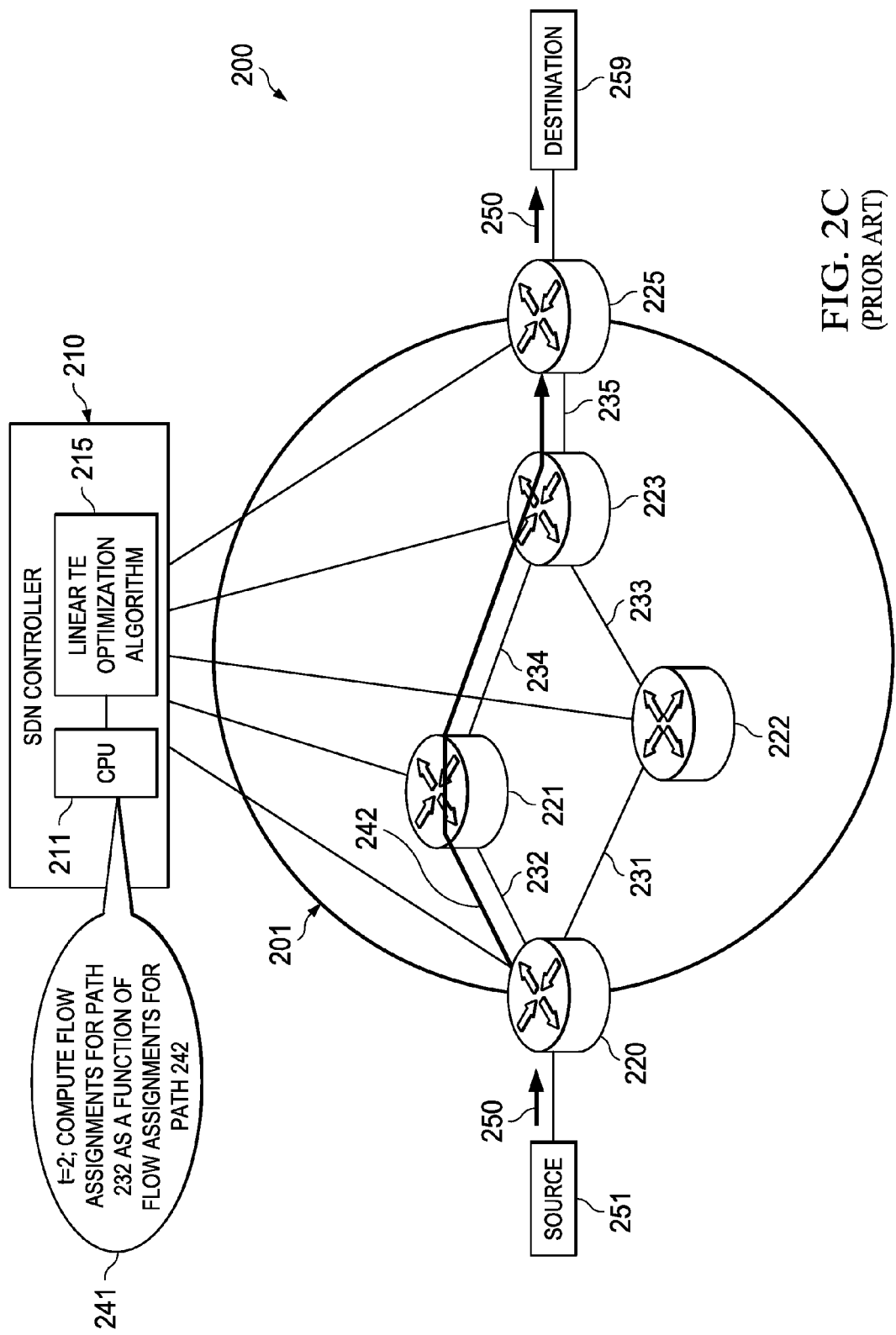

Traditional SDN traffic engineering schemes rely on linear path optimization. FIGS. 2A-2C illustrate a traditional SDN architecture 200 in which flow assignments are computed in accordance with a linear traffic engineering (TE) optimization scheme. As shown, the traditional SDN architecture 200 includes a communications network 201 comprising a plurality of network nodes 220-225 interconnected via a plurality of links 231-235. The communications network 201 is configured to transport a traffic flow 250 from a source 251 to a destination 259 based on flow assignments provided by an SDN controller 210. The SDN controller 210 includes a processor 211 configured to compute flow assignments in accordance with a linear TE optimization algorithm 215. More specifically, the processor 211 is configured to compute flow assignments for a path 231 during a first time interval (t1), as depicted in FIG. 2B, and to compute flow assignments for a path 232 during a second time interval (t2), as depicted in FIG. 2C. Due to the nature of the linear TE optimization algorithm, computation of the flow assignments for the path 232 may be based at least partially on the flow assignments computed for the path 231. Notably, many TE optimization algorithms are iterative in nature, meaning that the path optimization is performed repetitively until a constraint condition is met. Stricter constraint conditions may achieve better utilization efficiency, but may also require a higher number of flow assignment computation iterations. The traditional SDN architecture 200 may provide relatively quick execution times so long as the network 201 includes relatively few nodes, e.g., less than 100 nodes. However, as more nodes are added to the network 201, the execution period for computing flow assignments in the SDN controller 210 may increase significantly.

Figure 3A:
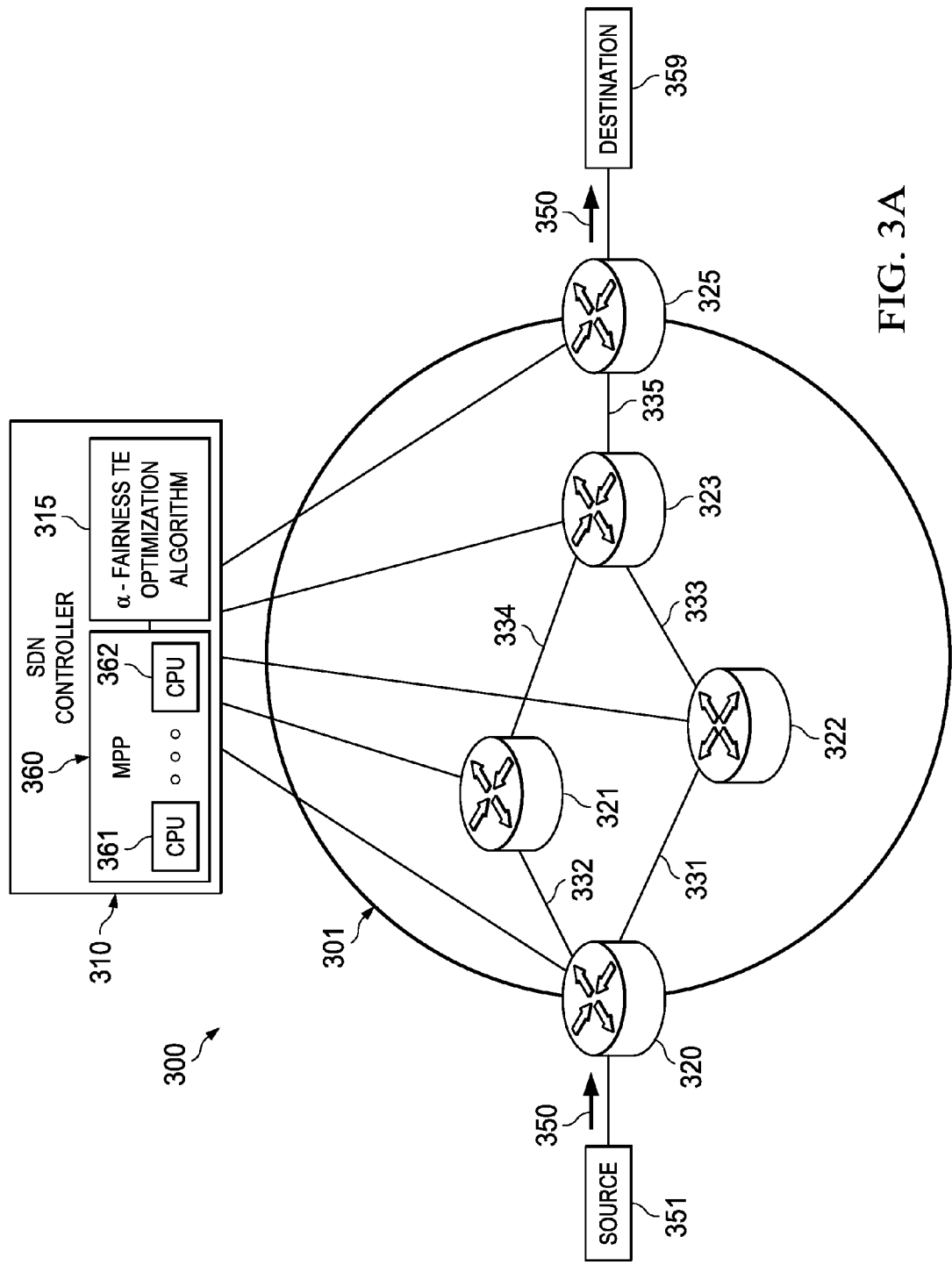
FIGS. 3A-3B illustrate diagrams of an embodiment SDN architecture adapted to compute flow assignments in accordance with an alpha-fairness TE optimization scheme.
Figure 3B:
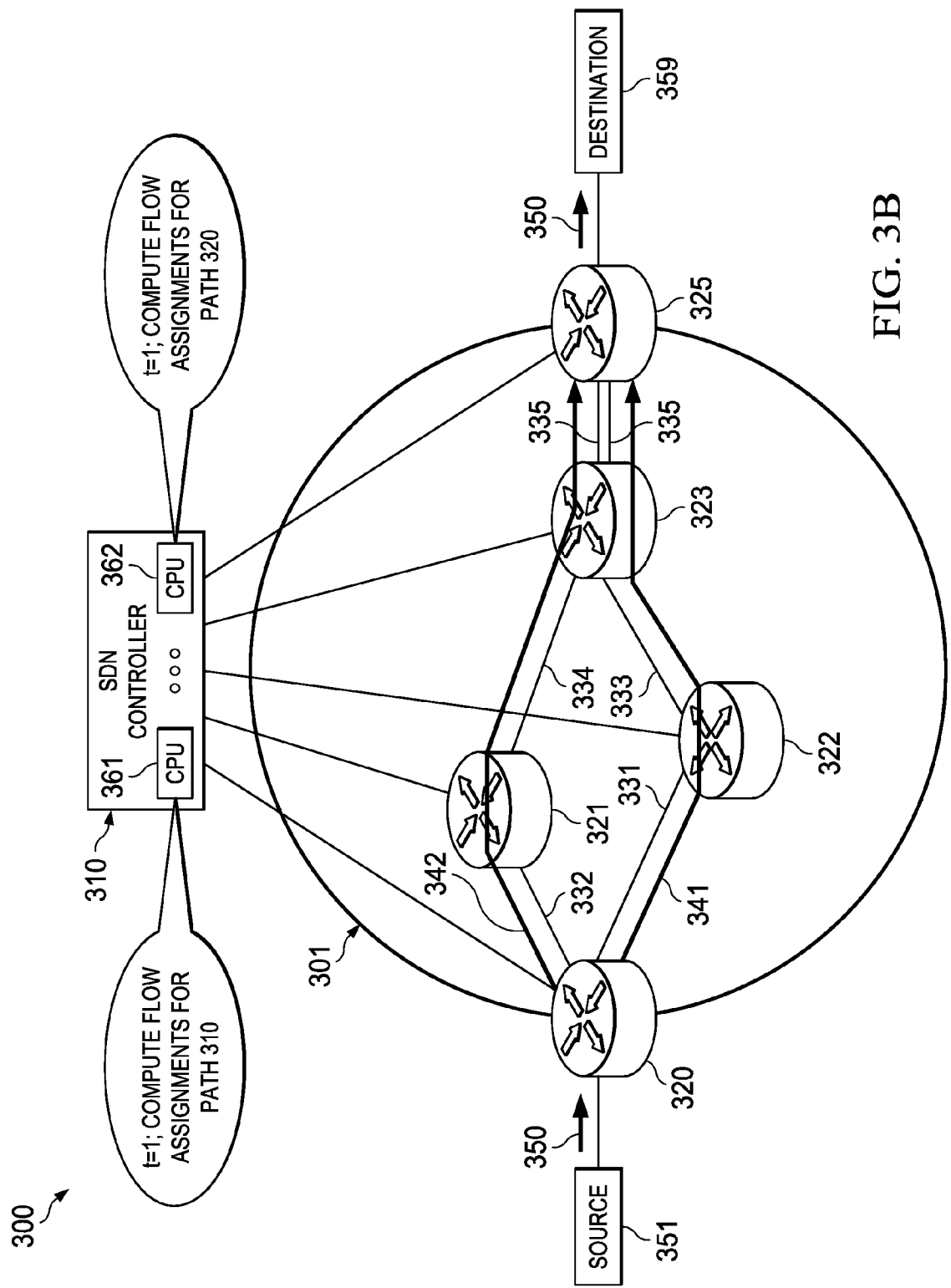

Aspects of this disclosure provide techniques for applying alpha-fairness resource allocation schemes to SDN traffic engineering optimization in a manner that provides near-linear scalability. FIGS. 3A-3B illustrate an embodiment SDN architecture 300 in which flow assignments are computed in accordance with an alpha-fairness TE optimization scheme. As shown, the embodiment SDN architecture 300 includes an SDN controller 310 configured to compute flow assignments for a communications network 301 comprising a plurality of network nodes 320-325 interconnected via a plurality of links 331-335. The communications network 301 may include any collection of components configured to transport a traffic flow 350 from a source 351 to a destination 359. The nodes 320-325 may include any data plane entity in the communications network 301, e.g., switches, routers, etc. The links 331-335 may be any virtual or physical connection configured to transport traffic between the nodes 320-325, including wireless and wireline interfaces. In embodiments, one or more of the links 331-335 comprise a virtual link corresponding to a series of concatenated interfaces. In embodiments, the nodes 320-325 correspond to a class of node (e.g., edge nodes) corresponding the SDN controller 310, where another class of nodes (e.g., intermediate nodes) are transparent to the SDN controller 310. Other configurations are also possible.

As shown, the SDN controller 310 includes a massively parallel processing (MPP) system 360 that includes a plurality of processors 361, 362 configured to compute flow assignments in accordance with an alpha-fairness TE optimization algorithm 315. Notably, the alpha-fairness TE optimization algorithm allows flow assignments to be computed in parallel. As a result, the processor 362 can compute flow assignments for a path 332 during the same time interval (t1) as the processor 361 computes flow assignments for a path 331 (as depicted in FIG. 3B). In other words, within a common interval, the MPP system 360 computes flow assignments for the path 312 independently from the flow assignments for the path 311 (and vice-versa).

Figure 4:
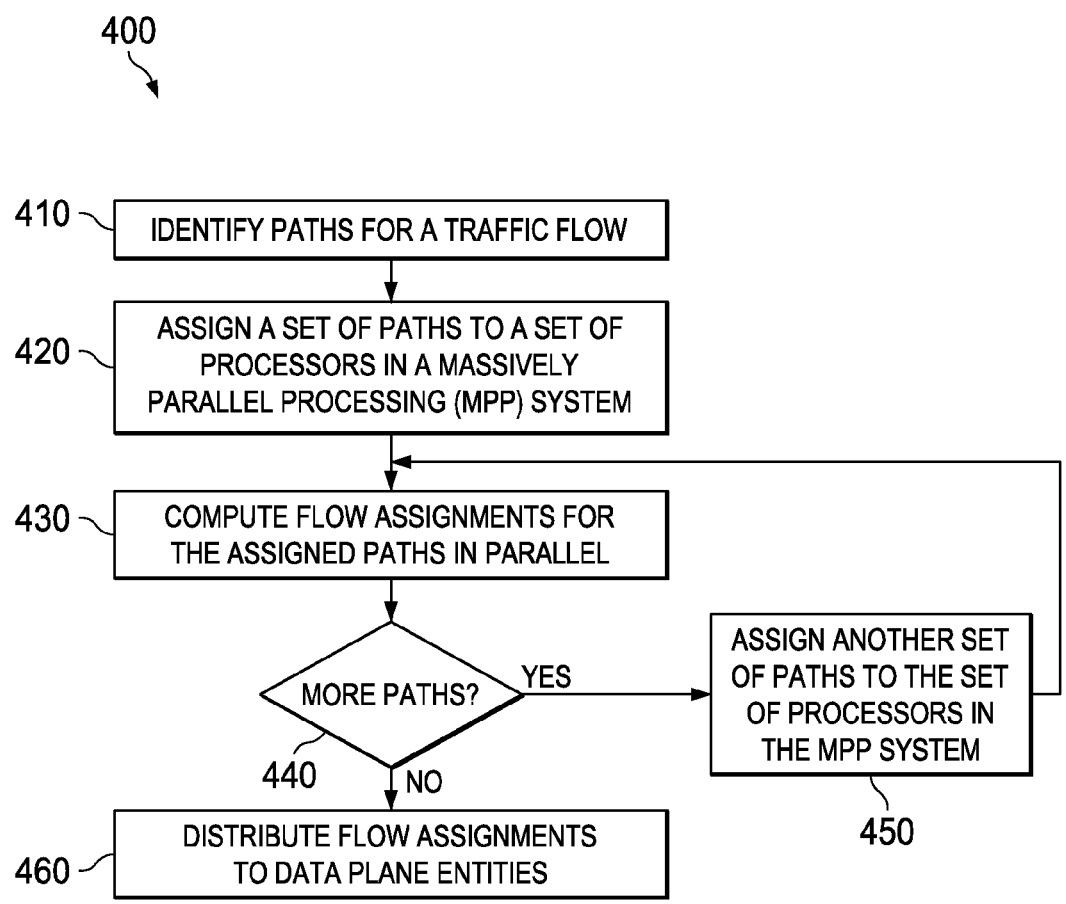
FIG. 4 illustrates a flowchart of an embodiment method for performing alpha-fairness TE optimization by an SDN controller.

Aspects of this disclosure provide methods for performing alpha-fairness TE optimization. FIG. 4 illustrates an embodiment method 400 for performing alpha-fairness TE optimization for a traffic flow by an SDN controller. As shown, the method 400 begins at step 410, where the SDN controller identifies paths for the traffic flow. The paths may include any available route for transporting the traffic flow between a defined ingress point and a defined egress point. Next, the method 400 proceeds to step 420, where the SDN controller assigns a set of paths to a set of processors in a Massively Parallel Processing (MPP) System of the SDN controller. The MPP system may include N processors (where N is an integer greater than or equal to two). Subsequently, the method 400 proceeds to step 430, where the processors compute flow assignments for the assigned paths in parallel. Thereafter, the method 400 proceeds to step 440, where the SDN controller determines whether additional paths are associated with the traffic flow. If so, the method proceeds to step 450, where another set of paths are assigned to processors in the MPP system, after which the method 400 reverts to step 430. If the SDN processor determines that no more paths are associated with the flow at step 440, then the method 400 proceeds to step 460, where the SDN processor distributes the flow assignments to data plane entities in the communications network. In some embodiments, the SDN processor may assigns multiple paths to each processor in the MPP system at step 420.

Figure 5:
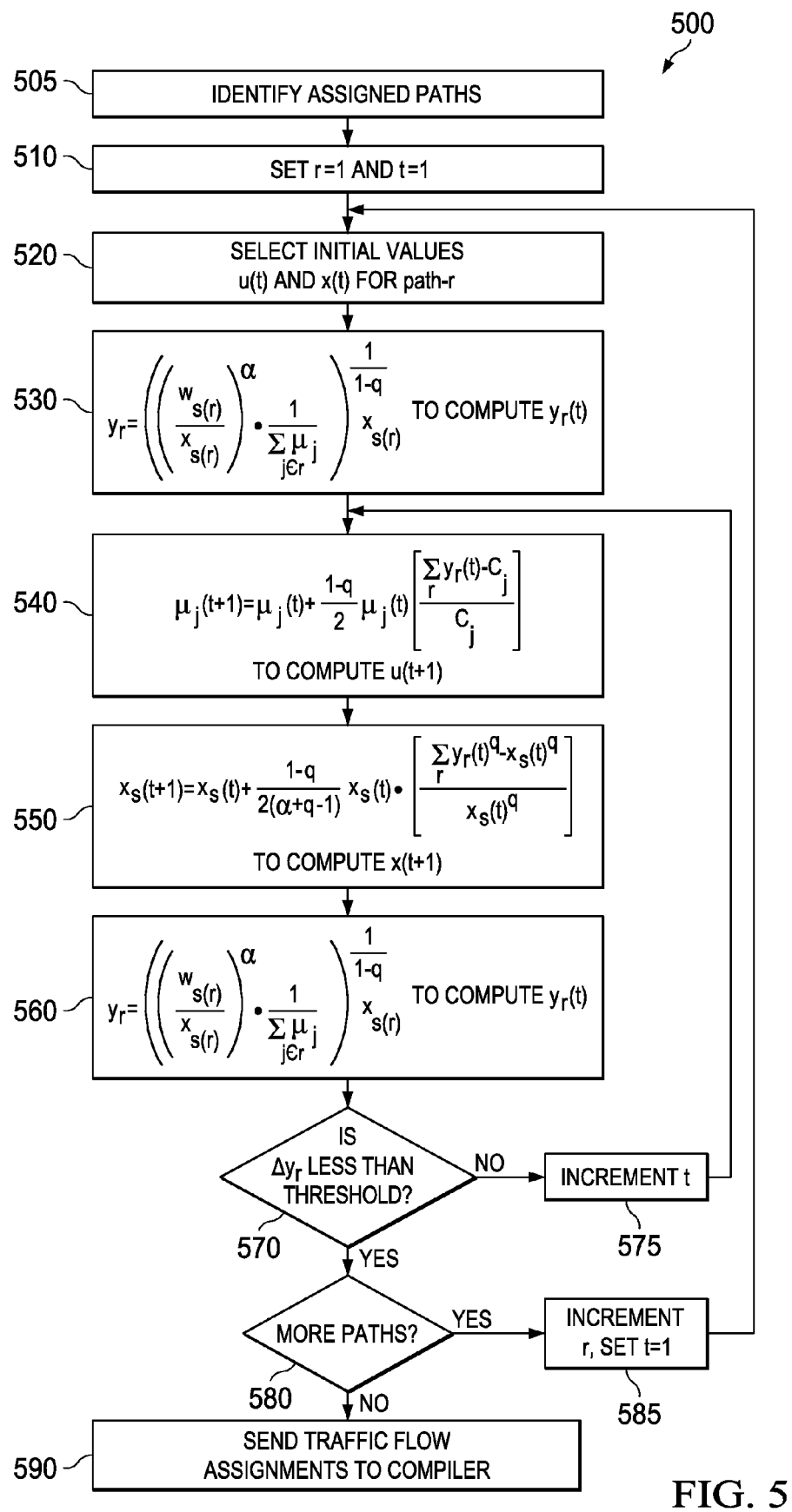
FIG. 5 illustrates a flowchart of an embodiment method for computing flow assignments for a set of assigned paths by a processor.

FIG. 5 illustrates a method 500 for computing flow assignments for a set of assigned paths, as might be performed by a processor in a MPP system of an SDN controller. As shown, the method 500 begins with step 505, where paths assigned to the processor are identified. Next, the method 500 proceeds to step 510, where a route counter (r) and an iteration counter (t) are set to one. Subsequently, the method 500 proceeds to step 520, where the initial values are selected for parameters $\mu_j(t)$ and $x_s(t)$ for path-r. The parameter $\mu_j(t)$ is a shadow price for links in the path-r at iteration(t), and the parameter $x_s(t)$ is the aggregate flow rate of a source destination pair associated with the path-r at iteration(t). As used herein, the term "shadow price" refers to the overall network cost for adding an additional unit of load to a link, path, or source-destination pair. Hence, parameter $\mu_j(t)$ refers to the network cost for adding an additional unit of load to the path-r at iteration(t).

Next, the method 500 proceeds to step 530, where the processor computes the parameter $y_r(t)$ using the following equation:

$$y_r(t) = \left(\left(\frac{w_{s(r)}}{x_{s(r)}}\right)^\alpha \cdot \frac{1}{\sum_{j \in r} \mu_j(t)}\right)^{\frac{1}{1-q}} x_{s(r)}(t).$$

The parameter $y_r(t)$ is the flow rate of the path-r at iteration(t). Thereafter, the method 500 proceeds to step 540, where the processor computes the parameter $\mu_j(t+1)$ using the following equation:

$$\mu_j(t+1) = \mu_j(t) + f(q)\mu_j(t)\left[\frac{\sum_r y_r(t) - C_j}{C_j}\right].$$

The parameter $\mu_j(t+1)$ is the shadow price of a jth link of path-r at iteration(t+1), and f(q) is a convex function for determining how quickly the equation converges. In an embodiment, the shadow price for links in the path-r (or in the set of paths) can be computed in parallel. In an embodiment, f(q) is (1−q)/m (where m is an integer greater than 1). Subsequently, the method 500 proceeds to step 550, where the processor computes the parameter $x_s(t+1)$ using the following equation $$x_2(t+1) = x_s(t) + f(q, \alpha)x_s(t) \cdot \left[\frac{\sum_r y_r(t)^q - x_s(t)^q}{x_s(t)^q}\right].$$

The parameter $x_s(t+1)$ is the aggregate flow rate of a source destination pair associated with the path-r at iteration(t+1), and $f(q,\alpha)$ is an alpha dependent convex function. In an embodiment, $f(q,\alpha)$ is (1−q)/(2(alpha+q−1)). Next, the method 500 proceeds to step 560, where the processor computes the parameter $y_r(t+1)$ using the following equation:

$$y_r(t+1) = \left(\left(\frac{w_{s(r)}}{x_{s(r)}}\right)^\alpha \cdot \frac{1}{\sum_{j \in r} \mu_j(t+1)}\right)^{\frac{1}{1-q}} x_{s(r)}(t+1).$$

The parameter $y_r(t)$ is the flow rate of the path-r at iteration (t+1). Thereafter, the method 500 proceeds to step 570, where the processor determines whether the change in the flow rate of path-r (e.g., $\Delta y_r = |y_r(t+1) - y_r(t)|$) is less than a threshold. If not, then the iteration (t) is incremented at step 575, and the method 500 reverts back to step 540. If the change in the flow rate of the path-r is less than the threshold, then the method proceeds to step 580, where the processor increments the counter (r) and sets the iteration counter (t) to zero.

Figure 6:
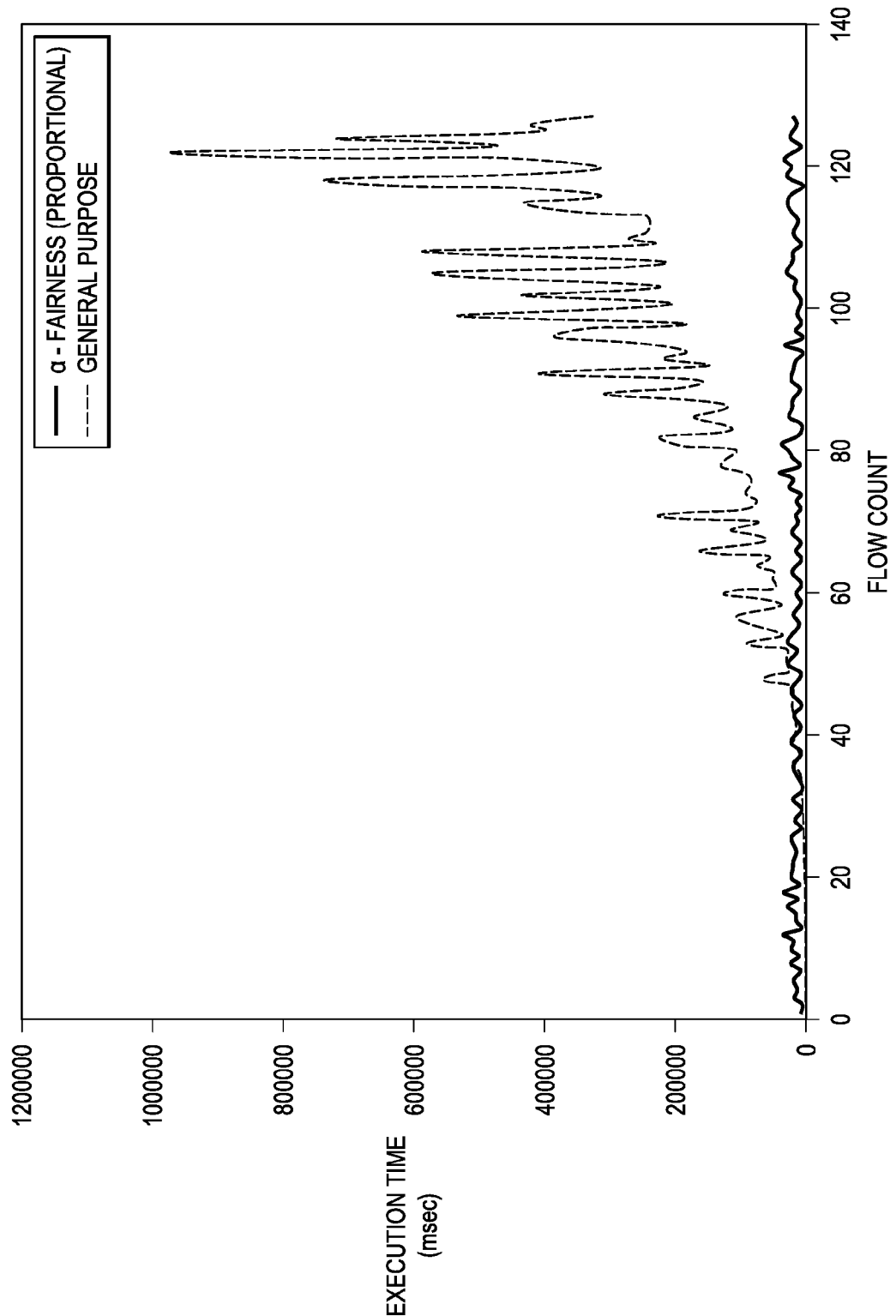
FIG. 6 illustrates a graph comparing execution times for a general purpose SDN traffic engineering algorithm and an embodiment alpha fairness SDN traffic engineering algorithm adapted for proportional fairness.
Figure 7:
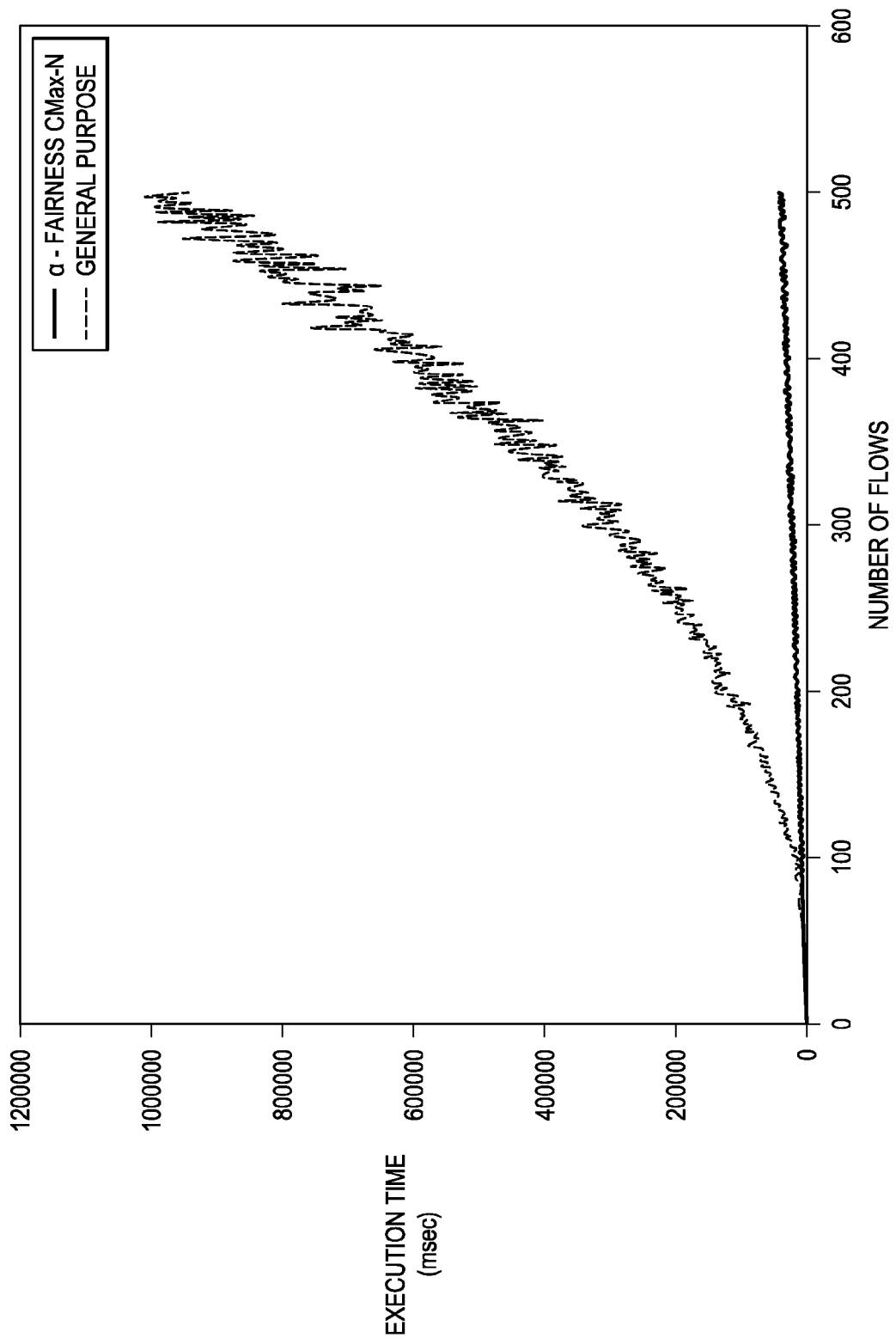
FIG. 7 illustrates a graph comparing execution times for a general purpose SDN traffic engineering algorithm and an embodiment alpha fairness SDN traffic engineering algorithm adapted for max-min fairness.
Figure 8A:
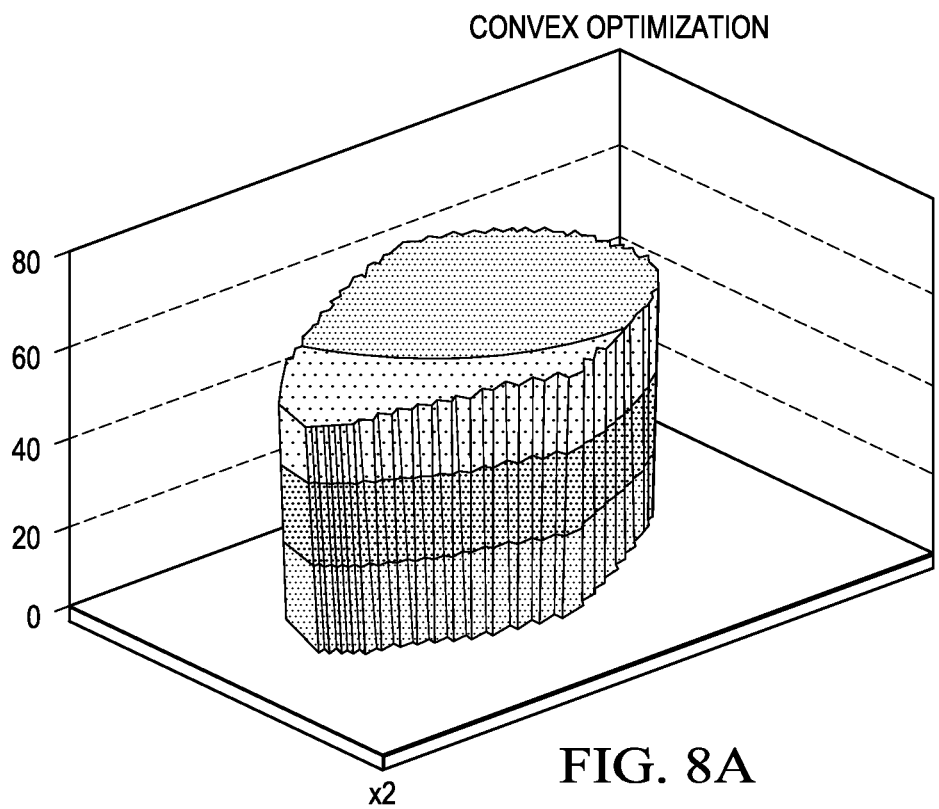
FIGS. 8A-8B illustrate natural linear and convex optimization programs.
Figure 8B:
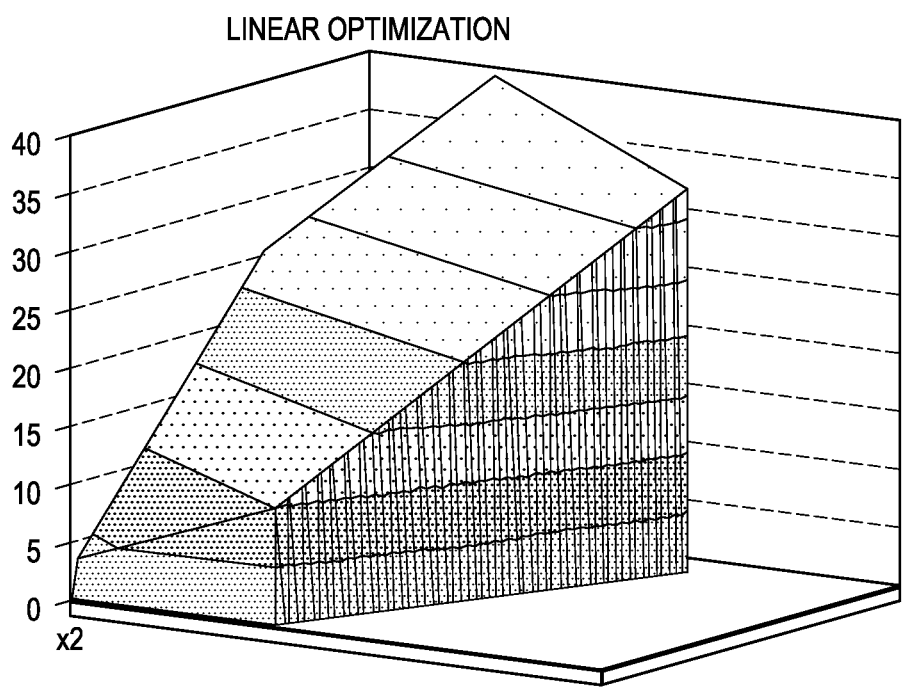

FIG. 6 illustrates a graph comparing execution times for a general purpose SDN traffic engineering algorithm (e.g., convex TE optimization) and an embodiment alpha fairness SDN traffic engineering algorithm adapted for proportional fairness. FIG. 7 illustrates a graph comparing execution times for a general purpose SDN traffic engineering algorithm (e.g., simplex TE optimization) and an embodiment alpha fairness SDN traffic engineering algorithm adapted for max-min fairness. As shown, the embodiment alpha fairness SDN traffic engineering algorithm provides near linear scalability, while the general purpose SDN traffic engineering algorithms provide polynomial scalability. FIGS. 8A-8B illustrate natural linear and convex optimization programs.

Two key network attributes related to traffic engineering are network throughput and fairness. A parameter $\alpha$ in the range [0, ∞] can be used to denote fairness. There are three specific values of $\alpha$ which may be of interest. Setting $\alpha=0$ corresponds to a flow assignment which maximizes the network throughput, but may not ensure fairness among flow assignments. Other values of alpha provide intermediate solutions.

As $\alpha \to \infty$, the flow assignment becomes max-min fair. A flow assignment is max-min fair when the bandwidth assigned to a flow may be increased only by (or primarily by) decreasing the bandwidth assigned to some other flow with an equal or smaller assignment. Thus max-min fairness may be focused on making the minimum flow assignment as large as possible without regard to the impact on total throughput.

Setting $\alpha=1$ corresponds to a proportional fair solution. Proportional fair solutions may constitute a solution to a negotiation problem. They provide an appealing compromise between max-min fairness—which allocates flows fairly without regard for network resource usage—and maximal throughput—which provides maximal resource usage without regard for fairness.

Optimization programs to solve these flow assignment problems are discussed in the publication "Routing, Flow, and Capacity Design in Communication and Computer Networks," by M. Pioro and D. Medhi, which is incorporated herein by reference as if reproduced in its entirety. The maximum throughput problem can be solved with a single linear program. The proportional fair problem may require a convex program, so a traditional linear solver may not be sufficient. The max-min fair problem may require the solution of a sequence of linear programs which grows polynomially with the problem size. Techniques for solving these problems all exhibit polynomial computation scalability, as traditional solutions require the repeated factoring of a matrix which grows with the problem size.

Aspects of this disclosure can be applied in many network architectures, including large carrier networks, ranging in size from one hundred to a few thousand nodes. Aspects of this disclosure provide embodiment methods for solving these problems which scales near-linearly with the problem size and is also well suited to a massively parallel implementation.

Aspects of this disclosure provide traffic engineering algorithms. In one example, the network is modeled as a set of J directed links, individually identified as j∈J. Each link has capacity $C_j$. The term r is used to identify a specific path through the network. An individual flow is identified by the term s. The bandwidth assigned to a specific flow is identified by $x_s$, and the bandwidth from flow s assigned to path r is identified by $y_r$. The terminology r∈s is used to denote the paths that are used by a specific flow and r∈j to denote the paths that use link j. When referring to a specific path r, the expression s(r) may be used to denote the parent flow of the path.

The optimization program for a weighted α fair flow assignment may be given by maximize $$\sum_{s \in S} w_s^\alpha \frac{x_s^{1-\alpha}}{1-\alpha},$$

subject to $$\sum_{r \in s} y_r = x_s, \quad \sum_{r \in j} y_r \leq C_j,$$

over x,y>0. The term $w_s$ is a weight assigned to each flow, allowing the user to request that some flows be assigned proportionally more or less bandwidth than others. This program has unique values for x, however the solution for y is usually non-unique. It is possible to define $$x_s = \left( \sum_{r \in s} y_r^q \right)^{\frac{1}{q}},$$

where q is some constant close to one, then the optimization problem has a unique solution for both the x values and the y values. With this change, the objective function becomes the convex function maximize $$\sum_{s \in S} w_s^\alpha \frac{\left( \sum_{r \in s} y_r^q \right)^{\frac{1-\alpha}{q}}}{1-\alpha}.$$

It is possible to express the Lagrangian for this problem as $$L(y, z; \mu) = \sum_s w_s^\alpha \frac{\left( \sum_{r \in s} y_r^q \right)^{\frac{1-\alpha}{q}}}{1-\alpha} + \sum_j \mu_j \left( C_j - \sum_{r \in j} y_r - z_j \right).$$

Here $z_j$ and $\mu_j$ are slack variables and shadow prices for link j respectively. From complementary slackness, we know that for a given j, either $\mu_j=0$ or $z_j=0$. In other words, in the solution to the optimization problem, either link j is saturated and its shadow price is non-zero, or link j is under committed and its shadow price is 0. It is possible to differentiate L with respect to $y_r$ to develop a relationship between y, x and μ:

$$\frac{\partial L}{\partial y_r} = w_{s(r)}^\alpha y_r^{q-1} \left( \sum_{r' \in s(r)} y_{r'}^q \right)^{\frac{1-\alpha}{q}-1} - \sum_{j \in r} \mu_j.$$

At the optimum point, this derivative will be equal to zero. Setting $$\frac{\partial L}{\partial y_r} = 0$$

and rearranging, it is possible to find that $$y_r = \left( \left( \frac{w_{s(r)}}{x_{s(r)}} \right)^\alpha \cdot \frac{1}{\sum_{j \in r} \mu_j} \right)^{\frac{1}{1-q}} x_{s(r)}.$$

Thereafter, it is possible to update the rules for $X_s$ and $\mu_j$ as follows: $\mu_j(t+1)=\mu_j(t)+k_j\dot{\mu}_j(t)\Delta t$ and $x_s(t+1)=x_s(t)+k_s\dot{x}_s(t)\Delta x_s$, where $k_j$ and $k_s$ are gain parameters for the update rules for μ and x respectively, and the dot notation denotes the time derivative.

Setting the gain parameters to their maximum stable values gives the optimization algorithm as $$y_r = \left( \left( \frac{w_{s(r)}}{x_{s(r)}} \right)^\alpha \cdot \frac{1}{\sum_{j \in r} \mu_j} \right)^{\frac{1}{1-q}} x_{s(r)}; \quad (1)$$

$$\mu_j(t+1) = \mu_j(t) + \frac{1-q}{2} \mu_j(t) \left[ \frac{\sum_r y_r(t) - C_j}{C_j} \right]; \quad (2)$$

$$x_s(t+1) = x_s(t) + \frac{1-q}{2(\alpha+q-1)} x_s(t) \cdot \left[ \frac{\sum_r y_r(t)^q - x_s(t)^q}{x_s(t)^q} \right]. \quad (3)$$

Each of the update rules in equations (1), (2) and (3) can be implemented in parallel. In other words, all of the $y_r$ values in (1) can be computed in parallel, then all of the $\mu_j$ values in (2) can be computed and so on. This property allows the algorithm to be implemented on massively parallel hardware.

The following describes simulation results obtained to assess the performance of embodiment traffic engineering algorithms provided by this disclosure. The simulations compare the algorithm results to reference implementations for max-min fairness and proportional fairness. The Lagrangian based algorithm is implemented in Java 7. For the reference implementations, a general purpose open source solvers was used, which was written in C and FORTRAN as detailed below. The simulations are run on an x86 based virtual machine.

The simulations use British Telecom's production network as a reference network. This network consists of 106 nodes and 237 links and is currently deployed across the United Kingdom. Flows are generated using a pseudo-random number generator so that the end points for each flow are randomly selected. All flows are treated as elastic, so they will consume all network bandwidth available to them.

The max-min fairness reference implementation is based on the GNU linear programming kit. This is a scalable open source linear solver written in C. The reference algorithm is Algorithm 8.3 from the paper "Routing, Flow, and Capacity Design in Communication and Computer Networks." For the Lagrangian algorithm, q=0.9 and α=4 were selected as an approximation for max-min fairness. As expected, the execution time grows rapidly with the problem size for the reference algorithm as larger problems require execution of an growing number of linear programs. The embodiment algorithm shows a roughly linear increase in execution time with problem size. Choice of q=0.9 provides a good approximation of max-min fair, holding the root mean square error at around 1%.

Proportional fairness reference implementation may require a convex optimizer as it has a non-linear objective function. This simulation used an interior point optimizer (Ipopt) obtained from http://project.coin-or.org/Ipopt, which is an open source library known for its good scalability properties. This library is written in C and FORTRAN and was configured with a MUMPS linear solver obtained from http://mumps.enseeiht.fr. The reference algorithm here is from section 8.1.3 of the publication "Routing, Flow, and Capacity Design in Communication and Computer Networks."

Proportional fair simulation results were also obtained In this case, the reference implementation used the execution of a single non-linear optimization program, so it doesn't exhibit the higher order polynomial growth of the max-min fair implementation. The embodiment Lagrangian based method generally matches the performance of the reference implementation. As with the max-min fair example, choice of q=0.9 keeps the RMS error to approximately 0.5%.

Regarding Convergence and Computational Complexity. Returning to equations (1), (2) and (3), consider how the compute effort and memory consumption of the algorithm grows with the problem size. The number of calculations required for the path and flow updates varies linearly with the number of paths and flows in the problem. In a similar manner, the number of calculations required to update the shadow prices varies linearly with the number of links in the network. This method of structuring the problem results in the low order polynomial growth in execution time we've observed in the simulation results. Similarly the memory requirements grow linearly with the problem size.

A significant factor in execution time is the number of iterations required to convergence. Convergence can be detected by measuring the relative change in the 2-norm of the vector of $y_r$ values—when this change drops below a threshold ($10^{-6}$ in our examples), the algorithm is stopped.

Empirically the number of iterations to convergence has varied in the range [200,1800]. There appears to be a direct relationship between the iterations to converge and the number of link constraints that are active or almost active. As the number of active constraints increases, the algorithm takes more time to explore the problem structure and converge to a solution.

Additional aspects of this disclosure are provided below by the paper entitled "Global optimization of network flows," as provided in the Appendix attached hereto. Notably, this is a pre-publication version of the paper, and therefore the contents of that paper should not be considered prior art to the subject matter provided by this disclosure.

Aspects of this disclosure provide the following benefits: Scalability. The optimizer demonstrates O(n) scalability with problem size as opposed to linear programming or convex programming which scales with $O(n^3)$ or worse. Even flow splitting. The optimizer splits flow evenly unlike LP solutions which tend to split flows unevenly. Tunable fairness. The parameter alpha allows tunable fairness ranging from maximum throughput to proportional fairness to max-min fairness. Parallelizability. The update rules are structured as vector updates (with no matrix factoring or other non-vector operations), making them easy to parallelize on hardware or a GPU.

Effective optimization may be key to SDN network performance. One of the objectives of SDN is commoditization of the switching hardware. This means that the value moves upstream to the SDN controller. Product differentiation may take place in the SDN controller where traffic engineering is a key function. Embodiment optimization techniques provided herein may be considered a de facto approach to SDN traffic engineering in next generation networks.

Figure 9:
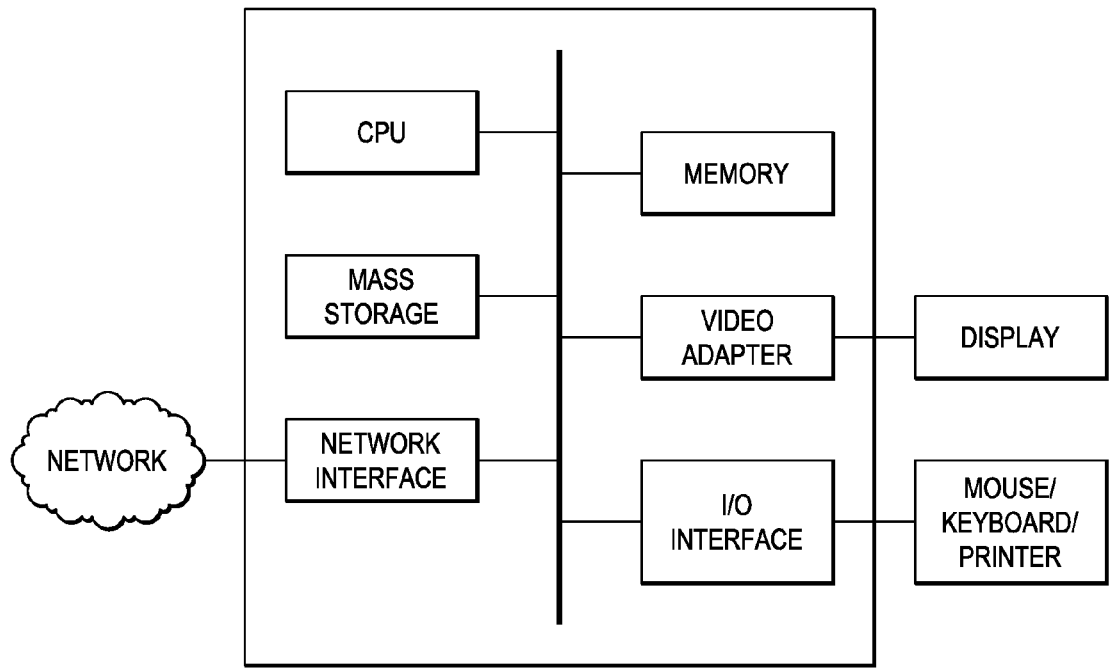
FIG. 9 illustrates a diagram of an embodiment processing system.

FIG. 9 illustrates a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Figure 10:
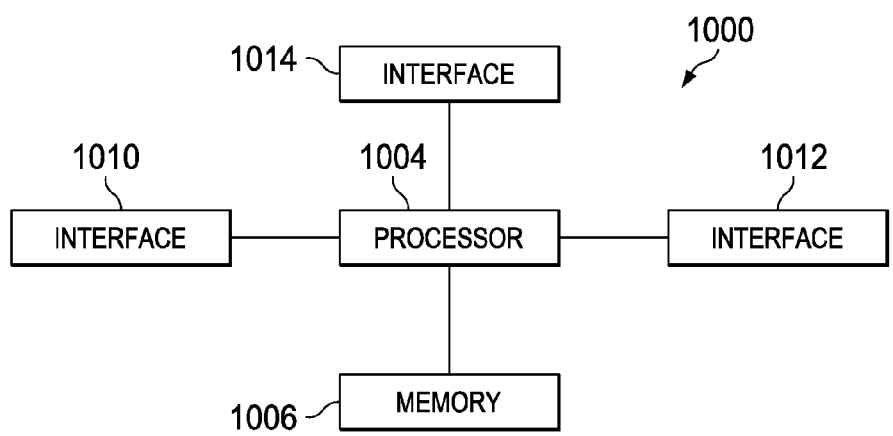
FIG. 10 illustrates a diagram of an embodiment communications device.

FIG. 10 illustrates a block diagram of an embodiment of a communications device 1000, which may be equivalent to one or more devices discussed above. The communications device 1000 may include a processor 1004, a memory 1006, and a plurality of interfaces 1010, 1012, 1014, which may (or may not) be arranged as shown in FIG. 10. The processor 1004 may be any component capable of performing computations and/or other processing related tasks, and the memory 1006 may be any component capable of storing programming and/or instructions for the processor 1004. The interfaces 1010, 1012, 1014 may be any component or collection of components that allows the communications device 1000 to communicate with other devices.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The following references are related to subject matter of the present application. Each of these references is incorporated herein by reference in its entirety:

Emilie Danna, "A Practical Algorithm for Balancing the Max-Min Fairness and Throughput Objectives in Traffic Engineering," IEEE INFOCOM (2012).

F. Kelly (2003) "Fairness and stability of end-to-end congestion control," European Journal of Control 9, 159-176 http://www.statslab.cam.ac.uk/~frank/PAPERS/fse2ecc.html F. Kelly and E. Yudovina (2014) "Stochastic Networks," Cambridge University Press http://www.statslab.cam.ac.uk/~frank/STOCHNET/LNSN/book.pdf T. Voice (2006) "Stability of Congestion Control Algorithms with Multi-Path Routing and Linear Stochastic Modelling of Congestion Control," PhD thesis, University of Cambridge S. Boyd & L. Vandenberghe, "Convex Optimization," Cambridge University Press (2004).

C.-Y. Hong et al. Achieving high utilization with software-driven wan. In Proceedings of the ACM SIGCOMM 2013, pages 15{26, 2013.

S. Jain et al. B4: Experience with a globally-deployed software de_ned wan. In Proceedings of the ACM SIGCOMM 2013, pages 3{14, 2013.

J. Nash. The bargaining problem. Econometrica, 18(2): 155{162, April 1950.

M. Piori & D Medhi, "Routing, flow and capacity design in communication and computer networks," Elsevier (2004).

M. Uchida & J. Kurose, "An Information-Theoretic Characterization of Weighted alpha-Proportional Fairness," IEEE INFOCOM (2009).

T. Voice. Stability of multi-path dual congestion control algorithms. IEEE/ACM Transactions on Networking, 15(6):1231{1239, December 2007.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for traffic engineering in a network, the method comprising:
   identifying, by a controller, a plurality of paths for communicating connection-oriented traffic flows over a data plane, the data plane including a plurality of links, wherein each of the paths comprise one or more of the links and extend between one of a plurality of source-destination pairs;
   iteratively computing, by the controller, a set of vector operations to obtain a first set of flow assignments, wherein iteratively computing the set of vector operations includes computing, for each iteration, flow rates for the plurality of paths, shadow prices for the plurality of links, and aggregate flow rates for the plurality of source-destination pairs, wherein the flow rates computed during an iteration are a function of the shadow prices and the aggregate flow rates computed during the iteration, wherein the shadow prices computed during the iteration are a function of the shadow prices and flow rates computed during a previous iteration; and
   communicating, by the controller, the first set of flow assignments to network nodes on the data plane, wherein the first set of flow assignments are configured to control communication of the connection-oriented traffic flows over the plurality of paths during a first period.

2. The method of claim 1, wherein two or more of the flow rates are computed independently from one another during a common iteration.

3. The method of claim 1, wherein two or more of the shadow prices are computed independently from one another during a common iteration.

4. The method of claim 1, wherein two or more of the aggregate flow rates are computed independently from one another during a common iteration.

5. The method of claim 1, wherein the aggregate flow rates computed during the iteration are a function of the aggregate flow rates and the flow rates computed during the previous iteration.

6. The method of claim 1, wherein the step of computing includes:
   selecting an initial set of shadow prices and aggregate flow rates, using the selected initial set of shadow prices and aggregate flow rates to determine an initial set of flow rates;
   using the determined initial set of flow rates to determine a new set of shadow prices and aggregate flow rates;
   using the new set of shadow prices and aggregate flow rates to determine a new set of flow rates; and
   repeating the steps of determining the new set of shadow prices and aggregate flow rates and determining the new set of flow rate until the determined set of flow rates satisfy a convergence condition.

7. The method of claim 1, wherein two or more of the flow rates for a given iteration are computed in parallel by a plurality of processors.

8. The method of claim 1, wherein two or more of the shadow prices and aggregate flows for a given iteration are computed in parallel by a plurality of processors.

9. The method of claim 1, wherein the set of vector operations include an alpha-fairness parameter that corresponds to a degree of proportional fairness provided to source-destination pairs.

10. The method of claim 9, wherein the magnitude of the alpha fairness parameter (a) is greater than or equal to zero and less than or equal to infinity ($0 \leq \alpha \leq \infty$).

11. The method of claim 1, wherein iteratively computing the set of vector operations to obtain the first set of flow assignments comprises:
iteratively solving a traffic engineering optimization algorithm in accordance with the flow rates for the plurality of paths, the shadow prices for the plurality of links, and the aggregate flow rates for the plurality of source-destination pairs for a plurality of iterations until a convergence criteria is satisfied.

12. The method of claim 1, wherein iteratively computing the set of vector operations comprises:
independently computing, by a first processor, a flow rate for a first path during an iteration in accordance with the following equation:

$$y_1(t) = \left(\left(\frac{w_{s(1)}}{x_{s(1)}}\right)^\alpha \cdot \frac{1}{\sum_{j \in r} \mu_j(t)}\right)^{f(q)} x_{s(1)}(t),$$

where $y_1(t)$ is a flow rate for the first path during a previous iteration, $W_{s(1)}$ is a weight parameter for a connection-oriented traffic flow transported over the first path, $X_{s(1)\_}$ is the aggregate flow rate for a source-destination pair associated with the connection-oriented traffic flow transported over the first path, $\mu_j$ is the shadow price for a link constraint j, and f(q) is a convex function; and
independently computing, by a second processor, a flow rate for a second path during the iteration in accordance with the following equation:

$$y_2(t) = \left(\left(\frac{w_{s(2)}}{x_{s(2)}}\right)^\alpha \cdot \frac{1}{\sum_{j \in r} \mu_2(t)}\right)^{\frac{1}{1-q}} x_{s(2)}(t),$$

where $y_2(t)$ is a flow rate for the second path during the previous iteration, $W_{s(2)}$ is a weight parameter for a connection-oriented traffic flow transported over the second path, $X_{s(2)}$ is the aggregate flow rate for a source-destination pair associated with the connection-oriented traffic flow transported over the second path; and
wherein the first flow rate and the second flow rate correspond to an iteration following the initial iteration.

13. The method of claim 1, wherein iteratively computing the set of vector operations comprises:
independently computing, by a first processor, a cost component for a first link of a path during an iteration in accordance with the following equation:

$$\mu_1(t+1) = \mu_1(t) + f(q)\mu_1(t)\left[\frac{\sum_r y_r(t) - C_1}{C_1}\right],$$

where $\mu_1(t)$ is a cost component for the first link during a previous iteration, $C_1$ is the capacity of the first link, f(q) is a convex function, $y_r(t)$ is a flow rate of the path during the previous iteration, and $\mu_1(t+1)$ is the cost component for the first link during the iteration; and
independently computing, by a second processor, a cost component for a second link of the path during the iteration in accordance with the following equation:

$$\mu_2(t+1) = \mu_2(t) + f(q)\mu_2(t)\left[\frac{\sum_r y_r(t) - C_2}{C_2}\right],$$

where $\mu_2(t)$ is a cost component for the second link during the previous iteration, C2 is the capacity of the second link, and $\mu_2(t+1)$ is the second cost component for the second link.

14. The method of claim 1, wherein iteratively computing the set of vector operations comprises:
independently computing, by a first processor, a bandwidth assigned to a first connection-oriented traffic flow during an iteration in accordance with the following equation:

$$x_1(t+1) = x_1(t) + f(q, \alpha)x_1(t) \cdot \left[\frac{\sum_r y_r(t)^q - x_1(t)^q}{x_1(t)^q}\right],$$

where $x_1(t)$ is a bandwidth assigned to the first connection-oriented traffic during a previous iteration, where $x_1(t+1)$ is a bandwidth assigned to the first connection-oriented traffic during the iteration, q is a convex function parameter, α is an alpha fairness parameter, f(q,α) is an alpha dependent convex function and $y_r(t)$ is a flow rate of an $r^{th}$ one of the paths configured to transport the first connection-oriented traffic during the previous iteration; and
independently computing, by a second processor, a bandwidth assigned to a second connection-oriented traffic flow during the iteration in accordance with the following equation:

$$x_2(t+1) = x_2(t) + f(q, \alpha)x_2(t) \cdot \left[\frac{\sum_r y_r(t)^q - x_2(t)^q}{x_2(t)^q}\right],$$

where $x_2(t)$ is a bandwidth assigned to the second connection-oriented traffic during a previous iteration, where $x_2(t+1)$ is a bandwidth assigned to the second connection-oriented traffic during the iteration, q is a convex function parameter, α is an alpha fairness parameter, and $y_r(t)$ is a flow rate of an $r^{th}$ one of the paths configured to transport the second connection-oriented traffic during the previous iteration.

15. The method of claim 1, wherein the network has a software defined network (SDN) architecture.

16. The method of claim 1, wherein the network is a multi-protocol label switching (MPLS) network.

17. A controller comprising:
a processing system; and
a non-transitory computer readable medium storing programming instructions for execution by the processing system, the programming including instructions to:
identify a plurality of paths for communicating connection-oriented traffic flows over a data plane, the data plane including a plurality of links, wherein each of the paths comprise one or more of the links and extend between one of a plurality of source-destination pairs;

iteratively compute a set of vector operations to obtain a first set of flow assignments, wherein the instructions to iteratively compute the set of vector operations includes instructions to compute, for each iteration, flow rates for the plurality of paths, shadow prices for the plurality of links, and to aggregate flow rates for the plurality of source-destination pairs, wherein iteratively computing the set of vector operations includes computing, for each iteration, flow rates for the plurality of paths, shadow prices for the plurality of links, and aggregate flow rates for the plurality of source-destination pairs, wherein the flow rates computed during an iteration are a function of the shadow prices and the aggregate flow rates computed during the iteration, wherein the shadow prices computed during the iteration are a function of the shadow prices and flow rates computed during a previous iteration; and communicate the first set of flow assignments to network nodes on the data plane, wherein the first set of flow assignments are configured to control communication of the connection-oriented traffic flows over the plurality of paths during a first period.

18. The controller of claim 17, wherein two or more of the flow rates are computed independently from one another during a common iteration.

19. The controller of claim 17, wherein two or more of the shadow prices are computed independently from one another during a common iteration.

20. The controller of claim 17, wherein two or more of the aggregate flow rates are computed independently from one another during a common iteration.

21. The controller of claim 17, wherein the instructions to iteratively compute the set of vector operations to obtain the first set of flow assignments include instructions to:

iteratively solve a traffic engineering optimization algorithm in accordance with the flow rates for the plurality of paths, the shadow prices for the plurality of links, and the aggregate flow rates for the plurality of source-destination pairs for a plurality of iterations until a convergence criteria is satisfied.

22. The controller of claim 17, wherein the instructions to iteratively compute the set of vector operations to obtain the first set of flow assignments include instructions to:

independently compute, by a first processor, a flow rate for a first path during an iteration in accordance with the following equation:

$$y_1(t) = \left(\left(\frac{w_{s(1)}}{x_{s(1)}}\right)^\alpha \cdot \frac{1}{\sum_{j \in r} \mu_j(t)}\right)^{f(q)} x_{s(1)}(t),$$

where $y_1(t)$ is a flow rate for the first path during a previous iteration, $W_{s(1)}$ is a weight parameter for a connection-oriented traffic flow transported over the first path, $X_{s(1)\_}$ is the aggregate flow rate for a source-destination pair associated with the connection-oriented traffic flow transported over the first path, $\mu_j$ is the shadow price for a link constraint j, and f(q) is a convex function; and independently compute, by a second processor, a flow rate for a second path during the iteration in accordance with the following equation:

$$y_2(t) = \left(\left(\frac{w_{s(2)}}{x_{s(2)}}\right)^\alpha \cdot \frac{1}{\sum_{j \in r} \mu_2(t)}\right)^{\frac{1}{1-q}} x_{s(2)}(t),$$

where $y_2(t)$ is a flow rate for the second path during the previous iteration, $W_{s(2)}$ is a weight parameter for a connection-oriented traffic flow transported over the second path, $X_{s(2)}$ is the aggregate flow rate for a source-destination pair associated with the connection-oriented traffic flow transported over the second path; and wherein the first flow rate and the second flow rate correspond to an iteration following the initial iteration.

23. The controller of claim 17, wherein the instructions to iteratively compute the set of vector operations to obtain the first set of flow assignments include instructions to:

independently compute, by a first processor, a cost component for a first link of a path during an iteration in accordance with the following equation:

$$\mu_1(t+1) = \mu_1(t) + f(q)\mu_1(t)\left[\frac{\sum_r y_r(t) - C_1}{C_1}\right],$$

where $\mu_1(t)$ is a cost component for the first link during a previous iteration, $C_1$ is the capacity of the first link, f(q) is a convex function, $y_r(t)$ is a flow rate of the path during the previous iteration, and $\mu_1(t+1)$ is the cost component for the first link during the iteration; and independently compute, by a second processor, a cost component for a second link of the path during the iteration in accordance with the following equation:

$$\mu_2(t+1) = \mu_2(t) + f(q)\mu_2(t)\left[\frac{\sum_r y_r(t) - C_2}{C_2}\right],$$

where $\mu_2(t)$ is a cost component for the second link during the previous iteration, C2 is the capacity of the second link, and $\mu_2(t+1)$ is the second cost component for the second link.

24. The controller of claim 17, wherein the instructions to iteratively compute the set of vector operations to obtain the first set of flow assignments include instructions to:

independently compute, by a first processor, a bandwidth assigned to a first connection-oriented traffic flow during an iteration in accordance with the following equation:

$$x_1(t+1) = x_1(t) + f(q, \alpha)x_1(t) \cdot \left[\frac{\sum_r y_r(t)^q - x_1(t)^q}{x_1(t)^q}\right],$$

where $x_1(t)$ is a bandwidth assigned to the first connection-oriented traffic during a previous iteration, where $x_1(t+1)$ is a bandwidth assigned to the first connection-oriented traffic during the iteration, q is a convex function parameter, $\alpha$ is an alpha fairness parameter, $f(q,\alpha)$ is an alpha dependent convex function and $y_r(t)$ is a flow rate of an $r^{th}$ one of the paths configured to transport the first connection-oriented traffic during the previous iteration; and independently compute, by a second processor, a bandwidth assigned to a second connection-oriented traffic flow during the iteration in accordance with the following equation:

$$x_2(t+1) = x_2(t) + f(q, \alpha)x_2(t) \cdot \left[ \frac{\sum_r y_r(t)^q - x_2(t)^q}{x_2(t)^q} \right],$$

where $x_2(t)$ is a bandwidth assigned to the second connection-oriented traffic during a previous iteration, where $x_2(t+1)$ is a bandwidth assigned to the second connection-oriented traffic during the iteration, q is a convex function parameter, $\alpha$ is an alpha fairness parameter, and $y_r(t)$ is a flow rate of an $r^{th}$ one of the paths configured to transport the second connection-oriented traffic during the previous iteration.

25. The controller of claim 17, wherein the aggregate flow rates computed during the iteration are a function of the aggregate flow rates and the flow rates computed during the previous iteration.

* * * * *